Sept. 29, 1931.    R. ESNAULT-PELTERIE    1,825,387
APPARATUS FOR TESTING PHYSICAL PROPERTIES OF MATERIALS
Filed Dec. 14, 1926    3 Sheets-Sheet 1

INVENTOR :
Robert Esnault-Pelterie,
By Attorneys,
Fraser, Myers & Manley

Patented Sept. 29, 1931

1,825,387

UNITED STATES PATENT OFFICE

ROBERT ESNAULT-PELTERIE, OF PARIS, FRANCE

APPARATUS FOR TESTING PHYSICAL PROPERTIES OF MATERIALS

Application filed December 14, 1926, Serial No. 154,700, and in Great Britain June 30, 1926.

This invention relates to apparatus for testing the physical properties of materials and has for its object to provide an apparatus which is adapted to facilitate the determination of such physical properties of materials as hardness or the co-efficient of elasticity, elastic limit, and the co-efficient of friction, either comparatively or absolutely. That is to say, the properties of one specimen may be compared with those of another known specimen, or the characteristics of one or more specimens may be determined with respect to any arbitarily chosen standard.

A further object of the invention is to provide means for continuously observing or recording the deformation, either temporary or permanent, in specimens under varying test conditions, and such recording of deformations may be either photographic or due to physical changes in a recording surface brought about by direct pressure.

The invention further contemplates a means for recording on the surface of a test specimen a plurality of indications from which curves may be plotted to establish the physical properties of the material over a wide range of conditions. The records thus made on the surface of the specimen being tested, are permanent and have the advantage of being inseparable from the specimen. Each specimen so tested will carry its own record of physical properties, such as hardness for example, and yet it is not required to produce any permanent deformation in the specimen as a whole, in order to obtain such records, the permanent indications of the behavior of the specimen under various pressures being made without necessity for exceeding the elastic limit of the material.

A further object of the invention is to provide an apparatus for making a plurality of observations of the size of the circle of deformation along different diameters whereby the accuracy of the determination of the physical properties of the material tested may be increased.

The invention further contemplates an apparatus for determining various physical properties of materials when such materials are shaped in accordance with the form in which they are to be actually employed, in use, as, for example, the spherical shape of the ball bearing, or the annulus of the ball race. Physical properties, such as hardness, elastic limit, co-efficient of friction, etc., are difficult to calculate in forms having curved shapes, and hence a direct determination of the physical properties of such shapes is highly advantageous.

According to the present invention the determination of the various physical properties of specimens of material depends upon the measurement of the contact area between two specimens, the surfaces of which are so related one to the other that an increase in the butting pressure tending to press the specimens together results in an increase in the contact area between them. The apparatus is not useful for testing specimens which would form a continuous contact surface when placed together without pressure, as for example, specimens having flat contact surfaces. Tests are, however, readily made employing one specimen with a flat surface and another with a convex surface opposing said flat surface, or tests may be made between specimens having curved surfaces of different degrees of curvature such that initially their contact area amounts theoretically only to a point of tangency.

In general it may be said that any specimens may be tested which present mutual contacting surfaces, the contact area of which varies with the butting pressure to which they are subjected.

The dimensions of the contact area between the specimens to be tested may be recorded photographically, preferably by the use of short wave length radiations, as, for example, the X-ray, a photographic record being made of the shadow cast by the two specimens on a photo-sensitive film. The contact areas between specimens under various pressures may be recorded directly on the specimen itself by providing an external surface which will be affected by pressure between the two specimens in such manner as to render visible, or photographically discernible, the contact areas. This result may be achieved by coating the surface of a specimen with silver sulphide or obtaining a coating by the use of hydrogen sulphide. It is obvious that any surface coating which is sufficiently thin so as not to materially affect the area of the contact circle between specimens and which is of such a nature as to be affected by pressure whereby to record the contact areas for subsequent study, will serve the purpose. I have found in actual practice, however, that silver sulphide is particularly satisfactory inasmuch as it may be deposited in an extremely thin layer upon the surface of almost any specimen, even one of glass, and furthermore, the coating, when subjected to pressure, is so altered as to render the contact area plainly visible and easy to photograph.

Generally considered, the apparatus comprises a rotatable specimen holder or turret, means at one side of the turret for subjecting a specimen mounted therein to variable butting pressure from a second specimen, a source of radiant energy of short wave length such as the X-ray, adapted to illuminate portions of the specimens close to the contact area between them whereby to cast a shadow, and means for photographing the shadow line representing a diameter of the contact area. The apparatus also is provided with means for making direct micrometer measurements of the contact area recorded on the surface of a specimen.

If specimens of spherical form are employed, the area of the contact circle up to, and even beyond the point of the elastic limit of the material will be relatively small; and even though the elastic limit of the material is exceeded, the permanent deformation in the specimen will be only local and will not in any way interfere with the subsequent test of the same specimen over ranges of pressure below the elastic limit of the material at points only slightly removed from the contact area where permanent deformation may have occurred.

It will be understood that the determinations of the physical properties of materials obtained by the use of this apparatus will be affected by the shape of the specimens tested, and this must be taken into account if the materials tested are to be utilized in other shapes. The apparent elastic limit of a small sphere of steel of a certain grade will be found, for example, to be materially higher than the elastic limit of the same steel in a flat block. This is due to the fact that a peculiar distribution of stress is set up when two spheres are pressed together, the pressure over the contact area varying from a maximum at the center of such area, to zero at the circumference of the contact circle. As a consequence of this, the material at the point of maximum stress is in a sense supported by the surrounding material, the stress in which tapers off to zero.

I am aware that other methods have been proposed for the accomplishment of certain of the objects above enumerated. The Hertz method contemplates, for example, the determination of the contact area between a transparent specimen, as, for example, glass or silica, and a second specimen which is pressed against the first specimen. A microscope, usually provided with an internal source of light, is so mounted as to permit an examination of the contact area by looking through the transparent specimen. The contact area itself is not visible but its dimensions will be outlined by light interference rings which are produced at a radius removed from the contact area by a distance to permit of a separation of the surfaces of the two specimens sufficient to produce interference effects. By this method the actual contact area is not measured. Furthermore, the method is limited in that it requires the use of a transparent specimen, whereas the apparatus according to the present invention permits equally well of the testing of opaque materials or materials which are only semi-transparent.

Another well known method for testing the hardness of materials contemplates the dropping of a stylus having a hardened point upon the material to be tested, and subsequently measuring the size of the indentation made. This method can never give anything like an absolute determination of hardness nor is it applicable to the testing of the elastic limit of materials or the modulus of elasticity. In the first place, if the stylus leaves any visible dent in the material tested, the elastic limit of the material must have been exceeded, and it is well understood that an examination of the behavior of materials after the elastic limit has been reached gives very little data that is of value in determining the behavior of materials under conditions to which they are normally subjected. The method does not lend itself to the testing of materials at stresses below the elastic limit because it does not provide means for recording the temporary deformations thus obtained, the moment the stylus leaves the specimen the deformation disappearing.

It has also been proposed to press two specimens together and then to subject such specimens to the action of an etching fluid. After a certain length of time the fluid is washed away and the pressure removed. The actual area of contact of the specimens will have been protected from the action of the etching fluid and will therefore be rendered visible. This method is relatively slow and does not permit of the continuous examination of any given specimen over a progressively varying range of conditions.

According to the present invention one specimen is mounted in a member which is slidable, and the other specimen is mounted in a member which is rotatable and susceptible of being displaced preferably about a vertical axis through approximately 180°, so as to permit of the microscopic examination of the record of the contact area of the specimen mounted in the rotatable member.

The slidable member is adapted to set up a butting pressure between the two specimens through the action of a push rod which is controlled by a beam. This beam may be variably weighted or subjected to any desired force whereby definite butting pressures between the specimens may be established. Means are also provided for relieving the specimens of the pressure set up by the beam whereby the one specimen mounted in the rotatable member may be carried to a position where it may be directly observed by the micrometer microscope. In making a direct photographic record of the shadows cast by the osculating specimens, the X-ray is preferably employed for the reason that because of the relatively short wave length of such ray, light will pass through the extremely small, narrow aperture between the specimens close to the point or area of contact. If ordinary light were employed, interference effects would be set up between the two specimens which would give a very exaggregated diameter of the contact circle rendering the observations far from accurate. With the X-ray the shadow cast by the specimens shows very closely the actual diameter of the contact area.

The provision of means for photographically recording the progressive effects of varying pressures combined with a means for directly observing such effects is particularly convenient, inasmuch as it is possible to determine by visual examination at what point the elastic limit of the material has been reached, and thereafter no further tests need be made in the majority of cases, whereas if no means for directly observing the effect of increasing pressure were provided, numerous photographic records might be made after the elastic limit has been passed, this consuming considerable time which is generally quite unnecessary.

It will be understood that the apparatus is not limited to the testing of specimens of any special shape, such as spheres, nor is its use limited to the determination of any of the physical properties of materials hereinbefore referred to. The apparatus hereinafter described will be understood by those skilled in the art to provide a device applicable to a wide variety of testing purposes. Further objects of the invention will be set forth in connection with the description of the accompanying drawings, in which

Fig. 2 is a plan view of the device shown in Figs. 1 and 1a.

Fig. 10 is a fragmentary side elevation of the apparatus similar to Fig. 1 but in addition shows the attachment of a camera to the microscope.

Figures 1, 3, 9:
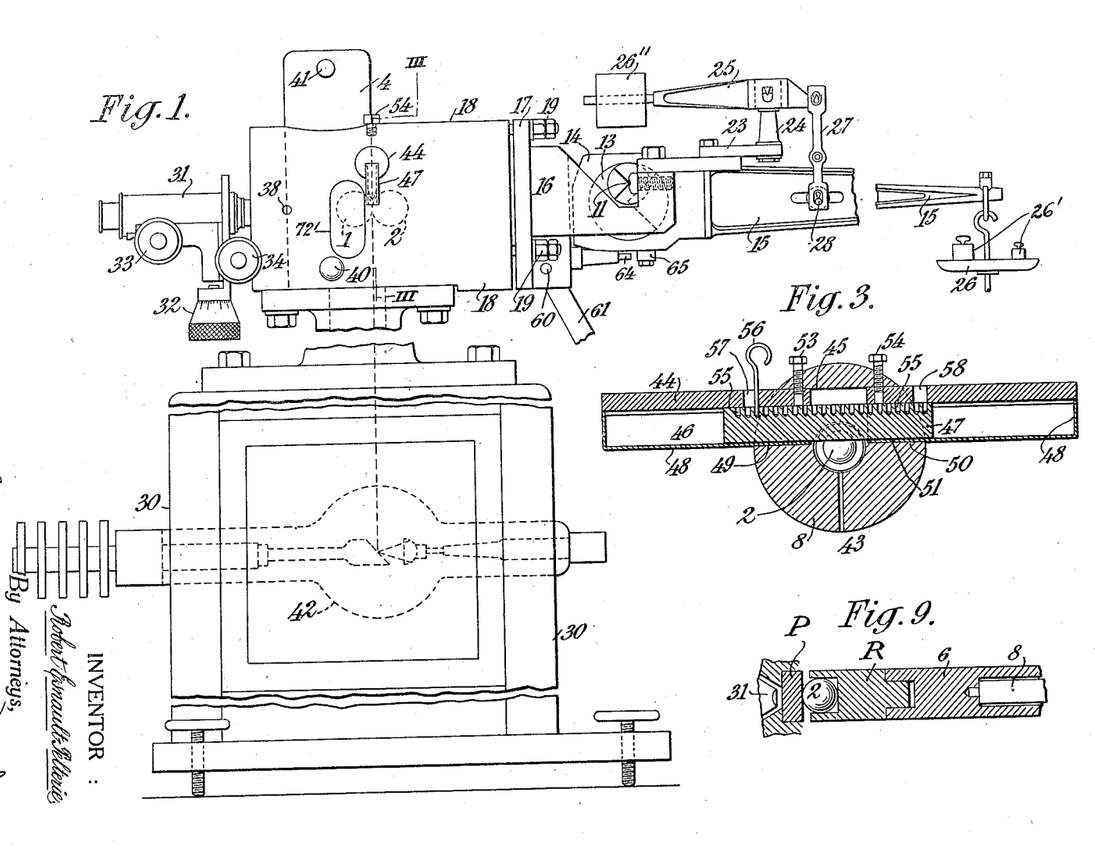
Figure 1 is an elevation of an apparatus in accordance with the present invention, the right-hand side being broken for convenience of illustration.
Fig. 3 is a cross-section of the photographic device taken along the line III—III of Fig. 1 hereinafter described.
Fig. 9 is a sectional view showing an arrangement according to the known Hertz method hereinafter described.
Figures 1A, 7, 7A, 8:
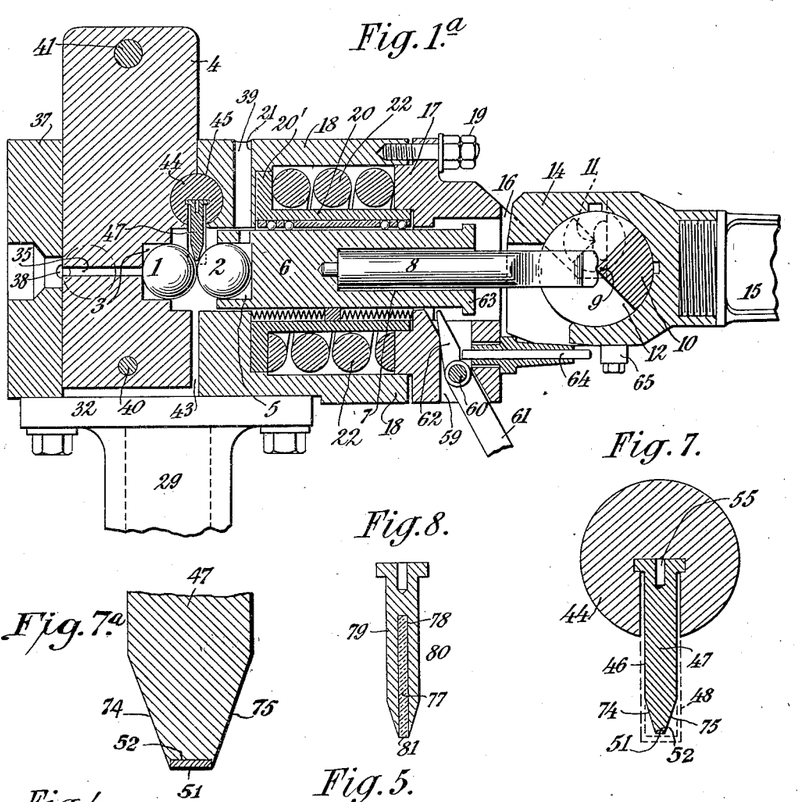
Fig. 1a is a central vertical section of Figure 1.
Fig. 7 drawn to an enlarged scale is a cross-section of a photographic film-carrier hereinafter described.
Fig. 7a is a further magnified view corresponding to Fig. 7 and shows the disposition of the film in the said carrier.
Fig. 8 drawn to an enlarged scale shows a modified form of carrier for use with a photographic plate.

It is assumed for the purpose of the present invention that the specimen or specimens to be tested consist of say two steel balls as shown in dotted lines in Figure 1 and in full lines in Figure 1a. These balls are indicated by the reference numerals 1 and 2, the ball 1 being positioned in a recess 3 in a rotatable member 4. The ball 2 is supported in a recess 5 formed on the inner end of a plunger 6 guided by balls 6' to reduce friction and having a recess 7 in which engages a rod 8. The rod 8 is formed at its outer end in such manner as to receive the pressure of a knife edge 9 formed on a member 10 on which two further aligned knife edges 11 are provided. These knife edges and the member 10 are more particularly shown in Figure 6. The member 10 is provided with flanges 12, 13 which engage in recesses provided in the head 14 of a scale beam 15 which is positioned between jaws 16 on a cover-plate 17. The cover-plate 17 is connected to a casing 18 by bolts and nuts 19. In the interior of the casing 18 is a sleeve 20 provided with a flange 20' supported in a recess 21 and between the flange 20' and the cover-plate 17 is arranged a helical spring 22. The spring 22 is strong enough to press the cover-plate 17 against the nuts 19 in spite of the force exerted by the knife edges 11 on the member 10 as that the said cover-plate 17 can be set at will in the correct position to obtain simultaneously, coincidence of the geometrical axis of the cover-plate 17 and the casing 18, and the correct distance between the knife edges 11 and ball 1, so that when the ball 2 is pressed against the ball 1 by the addition of desired weights 26' in scale pan 26 the beam 15 is exactly horizontal. The forward part of the cover-plate 17 carries a bracket 23 to which is secured an upright 24 and on which is supported by means of knife edges a beam 25, one end of which carries a counterweight 26'', the other end of the beam 25 being connected by means of two links 27 and knife edges to the scale beam 15 at the centre of gravity of the latter, as shown at 28. The counterweight 26 exactly balances the dead weight of the beam 15.

The hollow casing 18 is supported on an upright 29 secured to a hollow base 30 and at the rear of the hollow casing 18 is mounted a microscope 31 which can be adjusted vertically by the micrometrical adjusting screw 32, longitudinally of its axis by the screw 33 and laterally by the micrometrical screw 34. The member 4 which is rotatable preferably through 180° about a vertical axis, is provided with a passage 35 to permit of the introduction of a small rod or stiff wire to push the ball 1 out of the recess 3 when it is necessary or desired to change the said ball. Disposed before the microscope 31 and half in a part 37 of the casing 18 and half in the said casing 18 is a tangentially arranged hole 38 so as to permit of the passage of light rays artificial or natural tangentially to the ball when the latter has been carried by the rotation of the specimen holder 4 into position before the microscope, as shown in dotted lines in Fig. 1a. 39 is a hole for the insertion of a thin rod to expel the ball 2 when its removal is required. 40 is a removable pin which prevents rotation of the member 4 and 41 is a handle by means of which the member 4 can be rotated.

The hollow base 30 is adapted to carry a Roentgen ray or equivalent tube 42. The latter, as will be seen from Figure 1 of the drawings, is disposed centrally below the balls 1, 2. Between the rotatable member 4 and the hollow casing 18 is a space 43 through which the X-rays shine from the Roentgen ray tube 42 onto the contact area between the two balls 1, 2. Disposed half in the member 4 and half in the casing 18 and centrally above and between the balls 1 and 2 is a rod 44 slidably mounted in a space 45 in the member 4 and the casing 18. The rod 44 is recessed as shown (Figures 3 and 7) and into this recess is placed a photographic film carrier 47 recessed as at 46 which film carrier is maintained in position by a casing 48 (shown in full in Figure 3 and dotted in Figure 7) of metal or other suitable material which, as shown, extends into the member 4 and casing 18, as at 49, 50. The casing 48 also acts to prevent the access of light to a photographic film 51, Figures 3, 7 and 7a, mounted and suitably retained in position in a recess 52 formed in the lower end of the film carrier 47. 53, 54 are set screws for adjustably securing the rod 44 in the casing 18. The film carrier 47 is provided with a number of holes 55, into any one of which a pin 56 can be inserted through a hole 57 or a hole 58 in the rod 44. By means of the pin 56 the film carrier 47 can be displaced in either direction and a suitable distance when desired.

The cover-plate 17 is recessed as at 59 and therein is pivoted as at 60 a lever 61. The end 62 of the lever 61 is adapted to bear on the cover-plate and on a flange 63 formed on the plunger 6 so that the said plunger can be moved to the right and pressure taken directly off the ball 2 and consequently off the ball 1. In front of the end 62 of the lever 61 is a rod 64 which can be displaced by the lever-end 62 into engagement with a stop 65 so as to ease or slightly lift the beam 15 and thus relieve the pressure from the balls.

Figure 4:
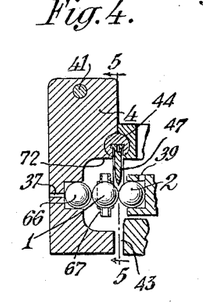
Fig. 4 is a sectional view of a modified form of a member for carrying one of the specimens to be tested.
Figures 5, 6:
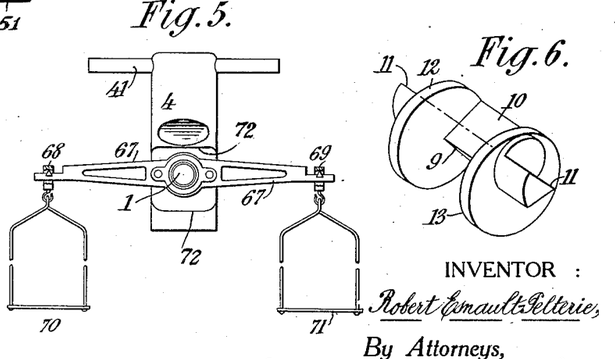
Fig. 5 is an elevation of Fig. 4 looking on the section plane 5—5 in the direction of the arrows.
Fig. 6 is a perspective view of the knife-edges member.

In Figures 4 and 5 which show respectively a section and an elevation of the modified form of the member 4, the balls in this arrangement are adapted for a friction test. As shown there are the balls 1 and 2 as previously and an additional ball 66. The ball 1 in this arrangement supports a light cross bar or beam 67 carrying knife edges 68, 69, from which are hung scale pans 70, 71. To permit of this arrangement the member 4 is recessed as shown at 72, and the cross bar 67 projects through the recess 72 and windows 72' in casing 18 to the exterior of the apparatus.

In order to determine the co-efficient of friction between specimens a definite pressure is applied to the balls by loading the beam 15. One or the other of the scale pans 70, 71 at the ends of the cross bar 67 is then progressively loaded until there is a rotational movement of the central specimen 1 with respect to the two specimens between which it is mounted, this movement being due to the torsional stress set up by the weight on the scale pan acting on the lever arm of the cross bar 67, the leverage of which is sufficient to produce a relatively high torque as compared with the frictional resistance to rotation occasioned by the very small contact surface between the balls.

The co-efficient of friction may also be determined by a somewhat different method. One of the scale pans on the cross bar 67 may be loaded to produce a definite torsional effect on the ball 1, but an effect which is insufficient to cause a movement of the ball. The beam 15 which causes the butting pressure between the balls may then be progressively relieved of weight until a movement of the cross bar 67 occurs.

The provision of two scale pans, one at either end of the cross bar, is to permit the taking of a series of friction tests in both directions. In actual practice the left hand pan, for example, is first loaded to effect a movement of the bar. This movement is slight, being limited by the size of the window 72' in the wall of the casing or frame 18. The weights are then shifted to the right hand pan and the cross bar rotated in the opposite direction.

Regardless of which of the methods above described is employed, a determination of the contact area between the specimens under the conditions corresponding to those at which movement occurs under the stress set up by the loading on cross bar 67 is made. This determination may be either by the photographic method hereinbefore described or by visual observation of the impression made on the surface coating of one of the specimens. Knowing the area of contact, the butting pressure between the specimens and the torque of the cross bar, the co-efficient of friction and other frictional properties of materials may be determined by calculation. It is unnecessary to know the area of the contact surface between the specimens in order to determine the co-efficient of friction between specimens the contours of which differ one from the other, because of the fact that the pressure at various parts of the contact area differs materially, the pressure being at a maximum in the center of such area and decreasing to zero at the outer edge thereof. The problem differs in this respect materially from the problem of determining the frictional characteristics of specimens which have normally flat contact surfaces. In the latter case the pressure is substantially uniform over the entire contact area, and this somewhat simplifies the computation. As previously pointed out, however, it is often highly desirable to determine the physical properties of specimens which are shaped so as to conform to the contact conditions under which the materials thereof will be subjected in actual commercial use.

Figure 7 drawn to an enlarged scale shows the film carrier 47, 51 indicating the film which may be of the same length as the film carrier 47 and the same width as the recess 52. Both sides 74 and 75 of the recess 52 are hardened and sharpened so that the film carrier 47 itself can effect the cutting of an ordinary photographic film into a film ribbon such as 51.

Figures 2, 10:
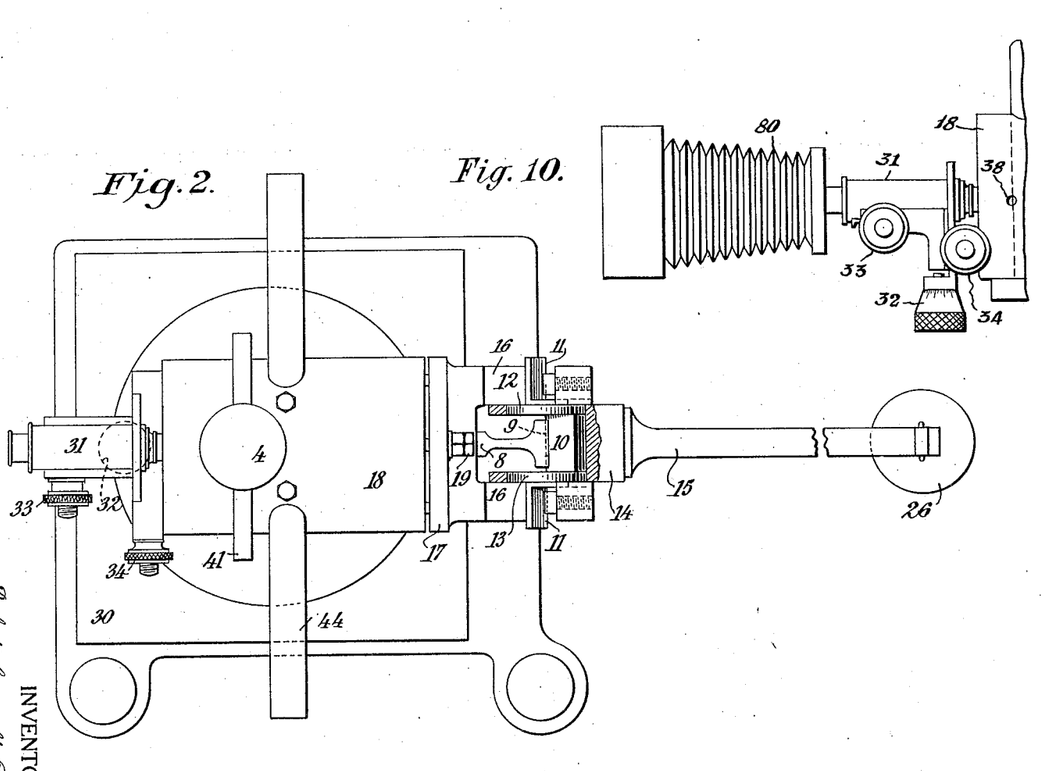

Alternately, and as shown in Figure 8, the film 51 shown in Figures 2 and 7, may be replaced by a glass plate 77 which is retained in position in a recess 78 by the pressure of the two metallic sides 79, 80 which are slightly resilient. In this particular arrangement the emulsion is placed on the edge of the plate as at 81. If desired, however, the glass plate 77 may be positively retained in the recess 78 by any suitable means.

Figure 9 shows in section a form for use in carrying out the Hertz method wherein a ball such as 2 is pressed against a quartz plate P. The ball in this arrangement is retained in a member R (Figure 9) which takes the place of the member 4 shown in Figure 2, the said member being actuated by the rod 8, and forming an extension of the slidable plunger 6.

Two methods of using the apparatus will now be described but it should be clearly understood that these methods need not follow each other in sequence, nor need each method be carried out by the apparatus. It is essential, however, for the purpose of comparing the results obtained by the first and second methods hereinafter described with that obtained by the Hertz method, which will also be hereinafter described, that the angularly displaceable member 4 should be removed and replaced by another member, fitted on the slidable member 6 so as to give the arangement shown in Figure 9.

Further, when it is desired to test for the coefficient of friction, the apparatus should be modified as shown in Figure 4, and in that case the angularly displaceable member 4 hereinbefore described would be replaced by another member of the construction shown in Figure 4.

The first method of examination according to the present invention and using the arrangement as in Figures 1, 1a and 2, either ball or both balls may be coated with silver sulphide. Assuming, however, that one ball, say the ball 1, has been previously coated with silver sulphide, the beam 15 is loaded with a definite weight and the balls are consequently pressed together. After a suitable time the pressure on the balls is released by manipulating the lever 61 and the pin 40 is removed from the member 4 which is rotated so as to permit of the ball 1 being presented exactly in front of the microscope 31. The angle through which the member 4 is rotated by means of the handle 41 is in the present apparatus exactly 180°. The ball 1 of Figure 2 then comes into position in front of the microscope 31 and the area of contact, evidenced by the crushed silver coating over the whole of the said area of contact and being tangentially illuminated through the hole 38 can be examined through the microscope 31. If so desired, both balls may be coated with silver sulphide and placed in the apparatus, one in the member 4 and the other in the plunger 6, the member 4 being thereafter locked in position by the pin 40 and the balls thereafter subjected to pressure. After a suitable time the pressure on the balls 1 and 2 is relieved and the member 4 carrying the coated ball 1 is rotated into a position in front of the microscope 31 through which the contact-area on the coated ball 1 may be examined.

The aforesaid method is somewhat slow and the procedure, especially for industrial purposes, may be greatly expedited by the second method. In the second method of examination the balls coated or uncoated, but preferably uncoated, may be subjected to pressure and a photograph of the shadow of one of the diameters of the area of contact may be obtained by means of Roentgen rays from the tube 42 on the film 51 or the photographic plate 77 mounted in the film-carrier 47, the photographic record being afterwards examined by means of a microscope.

It is often convenient to use a combination of the two methods above described, a plurality of photographic silhouettes of the diameters of the area of contact being made with an occasional visual observation through the microscope, whereby it may be determined when the elastic limit of the material has been reached, because otherwise the photographic observations might be continued unnecessarily. This would be particularly true in the case of testing new materials, the elastic limit of which was not known.

It will, of course, be understood that the microscope 31 may be provided in the usual manner as shown in Fig. 10, with a camera attachment 80 whereby the magnified image may be photographed, and thus a photographic record of the effect of various pressures on the surface coating of the specimen be made.

The Hertz method consists in testing for the hardness of a material by examining the interference rings which may be produced under pressure. For this purpose the ball 2 (Figure 9) is directly pressed against the quartz plate 36, the said ball being retained in the member 76. The latter, when the beam 15 is weighted, is acted on by the plunger 6 of which the member 76 forms an extension. The applied load forces the ball 2 against the plane surface of the quartz plate 36. In this arrangement the area of contact between the ball and the quartz plate is illuminated from the interior of the microscope 31 which is provided in its interior with a small reflexion prism which transmits the light normally onto the area of contact. When the ball and the quartz plate 36 are in contact and under pressure, interference rings will be produced around the contact area because of the refraction and reflexion which occurs in the space surrounding the actual contact area, in which space for a certain distance outward from the contact area there is an extremely small separation between the quartz plate and the ball. These interference rings can be viewed through the microscope and thus the size of the contact area determined.

The results obtained by the Hertz method may be considered as a standard and the results obtained by the first and second methods according to the present invention may be compared therewith or with each other.

It should be understood that with my silhouette method visible light can not be used, because interferences take place in the parts where the distance between the two balls becomes very small, and the shadow of the apparent diameter of contact is much larger than when measured by the silver coating method. The use of X-rays suppresses this inconvenience, because of their much shorter wave length.

By manipulating the film carrier in its holder 44 a considerable number of photographs can be taken, one after another, or in any desired order, of the contact-area between the balls when subjected to definite pressure. On development of the film the contact area between the balls will show as a clear space with two arcuate and opaque conical portions one at each side of the film. The distance between the apices of these black opaque portions of the film will indicate the diameter of the contact-area.

It should be clearly understood, however, that although the apparatus is hereinbefore described with reference to the testing of steel balls or silica balls, the said apparatus may be used for testing specimens of different materials under different pressure or for testing the specimens of the same material under different pressures whether such specimens be transparent or opaque. Further, one of the aforesaid specimens may be a standard specimen and the other specimen may be a sample of any desired material which it is desired to test.

While certain embodiments and modifications of my invention have been hereinbefore described, it will be understood that the invention is not limited thereto but that it may be variously modified and embodied without departing from the spirit of the invention as set forth in the following claims.

What I claim is:

1. An apparatus for use in testing the physical properties of materials, said apparatus comprising butting means for subjecting a specimen to pressure, and sensitized recording means adapted to receive and preserve a record of at least one of the dimensions of the area of contact between said specimen and the said butting means.

2. An apparatus for use in testing the physical properties of materials, said apparatus comprising butting means for subjecting a specimen to pressure, and photographic means adapted to record a diameter of the contact area between said specimen and said butting means.

3. An apparatus for use in testing the physical properties of materials, said apparatus comprising butting means for subjecting a specimen to pressure, sensitized recording means adapted to receive and preserve a record of at least one of the dimensions of the area of contact between said specimen and the said butting means, and visual micrometric means for measuring the diameter of the contact area without removing the specimen from the apparatus.

4. An apparatus for use in testing the physical properties of materials, said apparatus comprising butting means for subjecting a specimen to pressure, photographic means adapted to record the silhouette of the contact area of the specimen under test conditions, and a source of photographic illumination disposed so as to cast the shadow of the specimen upon said photographic means whereby to record a shadow image of the diameter of said contact area.

5. An apparatus for use in testing the physical properties of materials, said apparatus comprising butting means for subjecting a specimen to pressure, photographic means adapted to record a silhouette of the contact area, and a source of X-rays whereby the shadow of at least a part of the specimen will be projected upon said photographic means.

6. An apparatus for use in testing the physical properties of materials, said apparatus comprising butting means for subjecting a specimen to pressure, means adapted to record the photographic image of a plane passing through the center of the contact area of the specimen, said plane being substantially parallel to direction of the butting pressure, said specimen having a surface coating which is affected by the pressure so as to record the contact area directly on the surface of the specimen, a micrometer microscope, and means for moving said specimen from the photographic position to a position where the record of its contact area formed on the said surface coating may be measured by said micrometer microscope.

7. The steps in a method of testing the physical properties of materials comprising the application of a thin surface coating to the specimen to be tested, such coating being adapted to be altered by test pressure applied through a butting member, the mutual area of contact between the said specimen and member being a function of the applied pressure, and the said coating over the mutual contact area being altered by such pressure so as to optically differentiate such area from the surrounding surface of the specimen, and subjecting said specimen to a determined butting pressure such that upon the release of the specimen, the dimensions of the butting contact area will be recorded in the surface coating even though the pressure applied during the test be insufficient to produce a permanent deformation of the specimen.

8. An apparatus for use in testing the physical properties of materials, said apparatus comprising butting means for subjecting a specimen to pressure, a source of X-rays, a photo-sensitive surface adapted to record a plurality of images of at least the portion of the shadow cast by the contact area of the specimen, and means for progressively shifting said photo-sensitive surface whereby a plurality of exposures may be made to show the progressive change in the size of the contact area under changing pressures.

9. An apparatus for use in testing the physical properties of materials comprising a movable specimen holder, means adapted to subject a specimen in said holder to a definite butting pressure, and a micrometer microscope positioned with respect to said movable specimen holder so that the specimen may be moved into the field of the microscope after the removal of the pressure.

10. An apparatus for use in testing the properties of materials, said apparatus comprising means adapted to receive two pieces of material, means adapted to press said pieces of material together, said pieces of material having different contours such that changes in their contact pressure result in changes in their contact area, and optical means for ascertaining a diameter of the contact area while said two pieces of material are pressed together.

11. An apparatus for use in testing the physical properties of materials, said apparatus including means for subjecting two or more pieces of materials to a definite butting pressure, and means for photographically recording the size of the contact area existing between said pieces of material while said pieces are subjected to the said pressure.

12. An apparatus for use in testing the physical properties of materials, said apparatus including means for subjecting two or more pieces of materials to a definite butting pressure, a photo-sensitive recording surface, and a source of radiation having photographic properties, said radiation being directed toward the pieces of material at right angles to the line of pressure and in a direction to cast a shadow of the contacting pieces upon said photo-sensitive surface.

13. An apparatus according to claim 12, further characterized in that the said photo-sensitive recording surface comprises a photographic film, a carrier in which said film is mounted, and a housing for said carrier disposed transversely of the apparatus, said carrier being slidable in said housing to bring successive portions of said film into a position for recording successive exposures of the contact area between said pieces of material, under different pressures.

14. An apparatus according to claim 12, further characterized in that a slidable carrier is provided for said photo-sensitive recording surface, and a light tight housing for said carrier within which the said carrier slides, the said housing being adapted to receive carriers in which various forms of photo-sensitive records may be mounted.

15. An apparatus for use in testing the physical properties of materials, said apparatus including means for subjecting two or more pieces of material to pressure, a turret in which one of said pieces is mounted, a microscope for examining the contact area of the piece of material mounted in said turret, the said turret being rotatable to bring the said piece of material from the position in which it is subjected to pressure to a position within the field of the microscope, and said turret being removable from the apparatus.

16. An apparatus for use in testing the physical properties of materials, said apparatus including a slidable member, a rotatable turret, a specimen mounted in said turret, said slidable member being adapted to apply pressure to the said specimen when the turret is in one position, means for obtaining a photographic image of the specimen in said position and while subjected to pressure, and a micrometer microscope, the said turret being adapted to swing the specimen from the position in which it receives pressure to a position within the field of the microscope.

17. An apparatus for use in testing the physical properties of materials, said apparatus including a frame, a plunger slidably carried by said frame and adapted to exert pressure upon a specimen, a beam, oppositely-disposed knife edges toward one end of said beam, one of said knife edges exerting a thrust upon said plunger, the other of said knife edges being supported by said frame, and means for recording the area of contact between said specimen and a piece of material pressed against it.

18. An apparatus according to claim 17, further characterized in that the beam is horizontal and the knife edges thereon are arranged vertically one above the other, the upper knife edge bearing against the frame and the lower knife edge exerting a thrust against the plunger.

19. An apparatus according to claim 17, further characterized in that the frame is formed in sections, one of said sections supporting the specimen, another section supporting the beam, a spring interposed between said sections tending to thrust the sections apart, and a plurality of adjustable screw means adapted to bring said parts to the desired relative adjustment whereby the sections of the frame may be accurately positioned and all looseness or play between the sections eliminated.

20. An apparatus according to claim 17, further characterized in that the said knife edges are formed integrally in a block, which block is separate from the said beam but is rigidly mounted toward one end thereof in such manner as to form virtually a part of the beam.

21. An apparatus according to claim 17, further characterized in that the said knife edges are formed so that a central knife edge is flanked on either side by another knife edge, the two flanking knife edges having a common line, which line is parallel to, but removed from the line of the central knife edge.

22. An apparatus according to claim 17, further characterized in that the said knife edges are formed on the same member, the knife edges being disposed in substantially a vertical plane, the upper knife edges having a common line of action and flanking the lower knife edge, the said upper knife edges engaging the frame of the apparatus and the lower knife edge engaging the plunger, whereby a load placed at the free end of the beam will be transmitted through a bell crank of high leverage to produce a relatively large thrust on the plunger.

23. An apparatus for testing the frictional characteristics of specimens of material, comprising means for subjecting specimens to a butting pressure, a weighted arm connected to one of said specimens tending to overcome the frictional resistance due to the said butting pressure, and to rotate said specimen, and means for recording the contact area between said specimen and another piece of material pressed against it under the conditions at which rotation occurs.

24. A method of testing the physical properties of materials, said method consisting in photographing under radiations of a frequency higher than that of visible light, the shadow cast by the contacting portions of pieces of material which are pressed together with known force, said radiations being projected substantially at right angles to the direction of said pressure, whereby the relationship between the pressure and the contact area resultant therefrom may be ascertained.

In witness whereof, I have hereunto signed my name.

ROBERT ESNAULT-PELTERIE.